United States Patent [19]

Poorman

[11] Patent Number: 4,800,266
[45] Date of Patent: Jan. 24, 1989

[54] FIBER OPTIC SENSOR WITH LIGHT SAMPLING FOR REFERENCING

[75] Inventor: Thomas J. Poorman, Houston, Tex.

[73] Assignee: Western Atlas International, Inc., Houston, Tex.

[21] Appl. No.: 93,301

[22] Filed: Sep. 3, 1987

[51] Int. Cl.$^4$ .................................................. H01J 5/16
[52] U.S. Cl. .................................. 250/227; 250/231 R
[58] Field of Search ........................... 250/227, 231 R; 356/352, 345; 455/610, 612

[56] References Cited

U.S. PATENT DOCUMENTS

| | | | |
|---|---|---|---|
| 3,409,369 | 11/1968 | Bickel | 88/1 |
| 3,584,220 | 6/1971 | Non et al. | 250/199 |
| 4,162,397 | 7/1979 | Bucaro et al. | 250/199 |
| 4,207,561 | 6/1980 | Steensma | 340/600 |
| 4,319,186 | 3/1982 | Kingsley | 324/96 |
| 4,652,129 | 3/1987 | Martinelli | 250/227 |
| 4,652,744 | 3/1987 | Bowers et al. | 250/227 |
| 4,666,304 | 5/1987 | Davies | 250/227 |
| 4,697,926 | 10/1987 | Youngquist et al. | 250/227 |
| 4,725,143 | 2/1988 | Jones et al. | 250/227 |
| 4,728,191 | 3/1988 | Zarobila | 356/345 |

OTHER PUBLICATIONS

Grigory Adamovsky and Nancy D. Piltch, "Fiber-Optic Thermometer Using Temperature Dependent Absorption, Broadband Detection, and Time Domain Referencing", Dec. 1986, Applied Optics, vol. 25, No. 23, pp. 4439–4443.

Glenn Beheim, "Loss-Compensation Technique for Fiber-Optic Sensors and its Application to Displacement Measurements", Feb. 1987, Applied Optics, vol. 26, No. 3, pp. 452–455.

Primary Examiner—David C. Nelms
Attorney, Agent, or Firm—E. Eugene Thigpen

[57] ABSTRACT

The invention is an optical fiber sensor system in which an optical source, such as a laser diode, emits a pulse of optical energy which is transmitted in an optical path through an optical energy modulator. A partial reflector, included in the optical path before the optical modulator, reflects a portion of the optical energy of the pulse. The optical path terminates in an optical reflector, where the pulse is reflected back through the optical modulator to the partial reflector. The optical energy reflected by the partial reflector and the terminating reflector travels along the same optical path from the partial reflector to a photodetector and demodulator, where the magnitude of the parameter modulating the light modulator is determined from the relative magnitude of the energy reflected from the partial reflector and the terminating reflector.

8 Claims, 3 Drawing Sheets

FIBER OPTIC SENSOR WITH LIGHT SAMPLING FOR REFERENCING

BACKGROUND OF THE INVENTION

1. Field of the Invention

This invention relates to fiber optic sensors. The invention particularly relates to fiber optic sensors utilized for detecting the signature of a marine seismic source.

2. Description of the Prior Art

The use of optical fibers for detecting sound waves, temperature changes and other phenomena is well known. Fiber optic sensing systems include elements whose characteristics change with time, thereby introducing error into the system unless means are included for compensating for such changes. These changes include variations in the intensity of the optical source and variations in the light transmitting capacity of the optical paths.

U.S. Pat. No. 4,162,397, issued July 24, 1979 to Bucaro et al, shows an optical fiber acoustical sensor for detecting sound waves in a fluid medium. An optical fiber coil through which a light beam is transmitted is placed in a fluid medium. A sound wave propagating through the fluid medium and incident on the optical fiber coil changes the index of refraction of the optical fiber at the area of incidence. The change in the index of refraction causes a phase shift in the transmitted light which is detectable to denote the presence of the sound wave. This system, however, does not include any means of correcting for changes in the sensing system with time.

The article "Fiber Optic Thermometer Using Temperature Dependent Absorption, Broadband Detection, and Time Domain Referencing", by Grigory Adamovsky and Nancy D. Piltch, Applied Optics, Dec. 1, 1986, Vol. 24, No. 23, discloses a fiber optic thermometer. A reference channel is constructed in the time domain. A pulse modulated light source and a fiber-optic loop are utilized. The light pulse is coupled by a 2×2 coupler into a fiber optic loop which includes the temperature probe. A portion of the pulsed energy exits the loop when it returns to the 2×2 coupler and a portion travels around the loop again, and when it returns to the coupler, a second portion exits the loop. By comparing the amplitude of the energy exiting the loop after the first and second paths, the temperature is determined. Because the measurementss are made of two pulse amplitudes having the same origin, and traversing the same path, the system substantially compensates for time-varying parameters. A disadvantage is that the entire fiber optic recirculating loop, including the sensor, acts as a sensing element.

The article "Loss-Compensation Technique for Fiber-Optic Sensors and its Application to Displacement Measurements", by Glenn Beheim, Applied Optics, Feb. 1, 1987, Vol. 26, No. 3, discloses a system in which a beam splitting transducer modulates, as a function of the sensed parameter, the proportion of the incident light which it transmits and reflects. Using a four fiber optical link, light is impinged onto the transducer from either direction, and, in each case, the transmitted and reflected light are measured. These four signals are processed to remove the influence of the fiber and connector losses.

SUMMARY OF THE INVENTION

The invention is an optical fiber sensor system. An optical source emits a light pulse which travels in an optical path to a light modulator. A partial reflector is included in the path in front of the modulator and the optical path terminates in a reflector behind the light modulator. The light pulse travels back from the terminating reflector to the partial reflector and from that point the pulses reflected from the partial reflector and the terminating reflector travel along the same path to a photodetector and demodulator, where the magnitude of the parameter modulating the light modulator is determined from the relative magnitudes of the two reflected pulses.

DESCRIPTION OF THE PREFERRED EMBODIMENT

Figure 1:
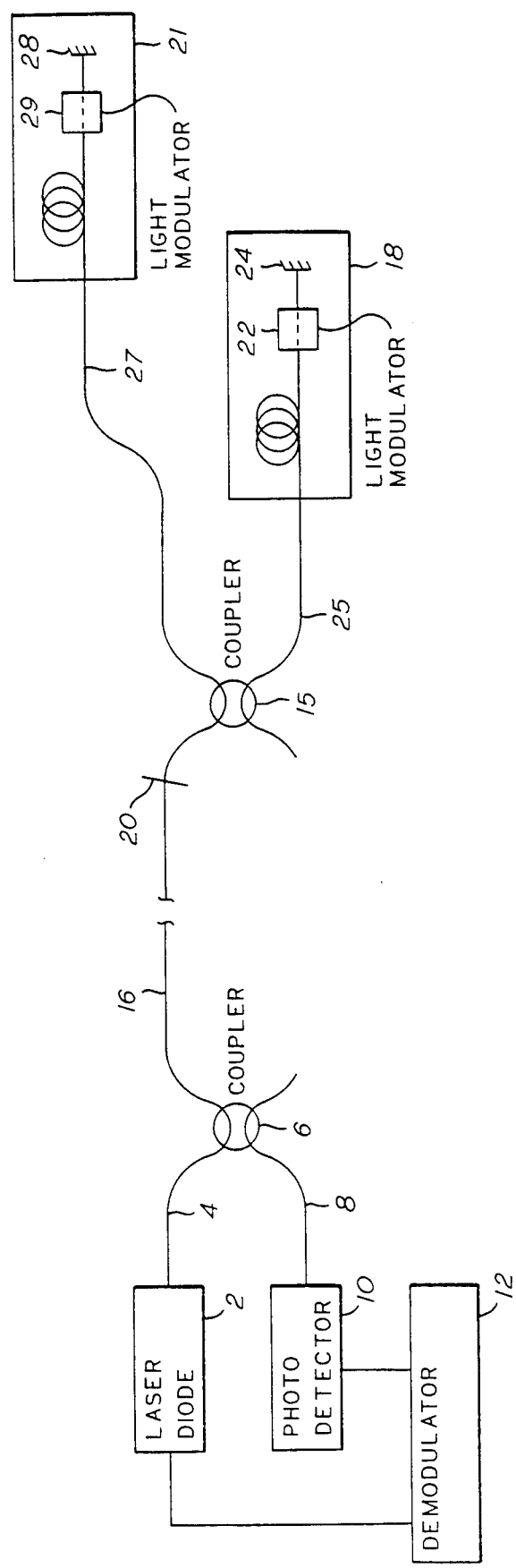
FIG. 1 shows a block diagram of a preferred embodiment of the invention.

A diagram of a preferred embodiment of the invention is shown in FIG. 1. Optical energy source 2, which may be a laser diode, transmits an optical energy pulse through optical path 4, coupler 6 and optical path 16. In the particular embodiment described herein, this pulse may be 90 nanoseconds in duration. A portion of the optical energy is reflected by partial reflector 20. The remainder of the optical energy is coupled by coupler 15 into optical paths 25 and 27. The optical energy coupled into optical path 25 travels through light modulator 22 to reflector 24 at which point the energy is reflected. The optical energy coupled by coupler 15 into optical path 27 travels through light modulator 29 and is then reflected by reflector 28. Modulator 22 may be included in a housing 18 and modulator 29 may be included in a housing 21.

Optical energy reflected by reflectors 20, 24 and 28 travels back along optical paths 16 and 8 until it reaches detector 10. The lengths of the optical paths between partial reflector 20 and reflector 24, and between partial reflector 20 and reflector 28, are selected so that the returning light pulses from the three reflectors are separated in time. In the particular embodiment described herein, a 10 nanosecond pulse separation is selected. Light travels about 20 meters in 100 nanoseconds. Therefore, in order to achieve a 10 nanosecond separation between the pulses reflected from partial reflector 20 and reflector 24, which will have pulse widths of 90 nanoseconds, the one-way optical path length between reflectors 20 and 24 is selected to be about 10 meters. Similarly, the one-way optical path length between partial reflector 20 and reflector 28 is selected to be about 20 meters, to achieve a separation of 10 nanoseconds between the pulses reflected from reflectors 24 and 28.

In the particular preferred embodiment described herein, two light modulators are utilized. One of ordinary skill in the art would understand that only one light modulator might be utilized, and that the invention is extendible to more than two light modulators.

The three returning pulses are detected by photodetector 10 which generates electrical signals having an amplitude corresponding to the magnitude of the reflected pulses. These electrical pulses are sampled in demodulator 12 to determine the magnitude of th modulating parameter sensed by the light modulators.

The form of the light modulators 22 and 28 is not critical to the invention; the light modulators may be microbend sensors, moving grating sensors, or other types of sensors. The invention is a system for compensating for variations in slowly varying changes within the system other than the dynamic parameter which is intended to be measured. These slowly varying, or steady state, changes include temperature changes, bending of the fiber, and electro-optical changes in the optical source and the optical paths. This compensation is achieved by comparing the signal magnitude reflected from partial reflector 20 to the signal magnitudes reflected from reflectors 24 and 28. Because the pulses will have traveled through the same path, except for the distances between partial reflector 20 and reflectors 24 and 28, the system compensates for steady state changes in the system up to the point of partial reflector 20. Some residual error will remain due to changes in the optical path between reflector 20 and reflector 24, and between reflector 20 and reflector 28, but the changes in this portion of the path length will normally be much smaller than changes in the optical source and detector and over the distance between the optical source to the partial reflector and back to the detector. The parameter to be measured might be the pressure wave generated by a marine seismic source. In such a system, the optical energy source 2, photodetector 10, demodulator 12 and coupler 6 will normally be located on board the vessel; and partial reflector 20 and coupler 15 will be located close to light modulators 22 and 29, so that optical path 16 will be much longer than optical paths 25 and 27.

Demodulator 12 is a timing and sampling unit. It generates the timing signal which causes laser diode 2 to emit a light pulse and controls sampling circuits for sampling the amplitude of the optical pulses reflected from reflectors 20, 24 and 28.

Figure 2:
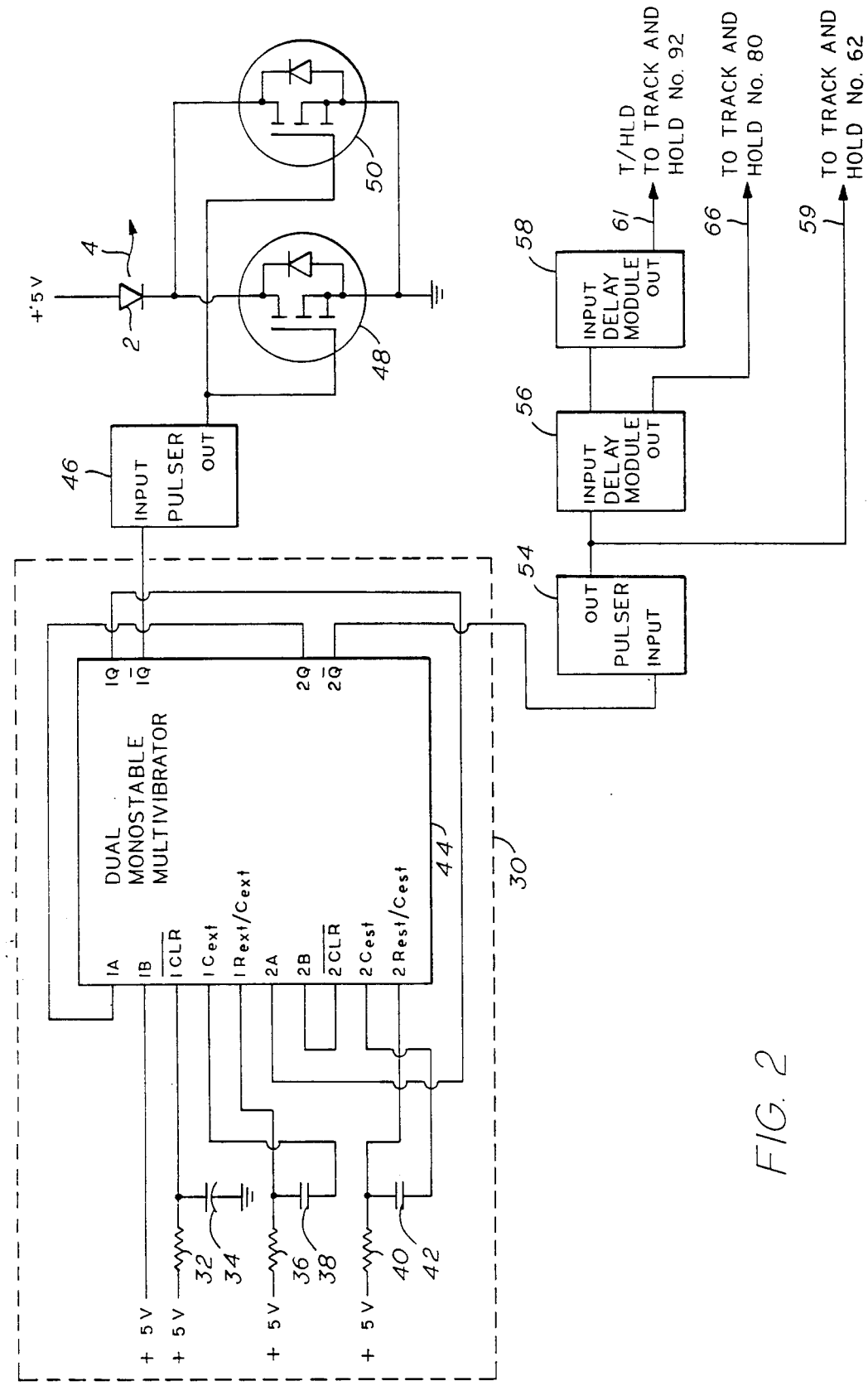
FIG. 2 shows a diagram of a portion of the sensor electronics.
Figure 3:
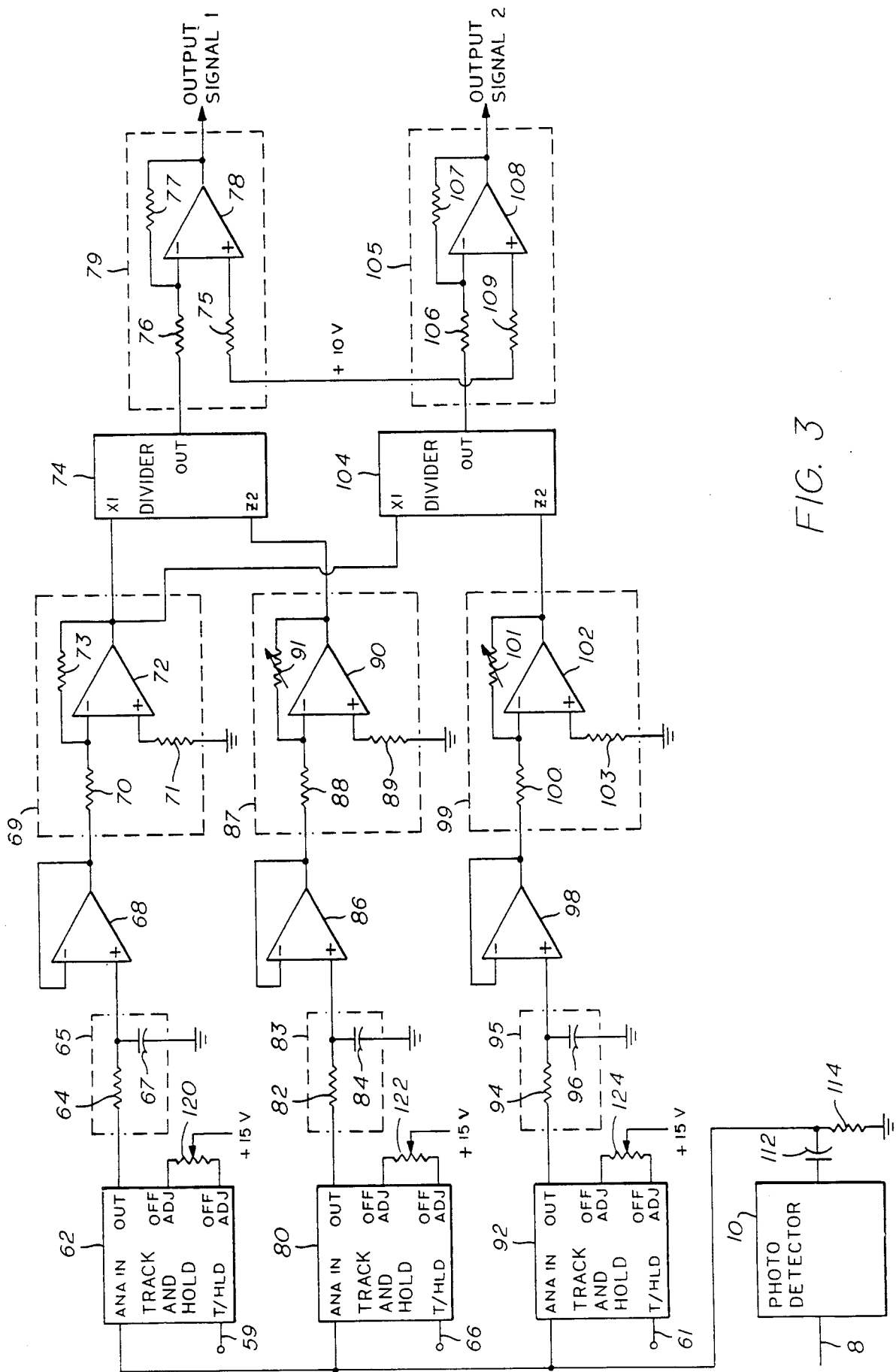
FIG. 3 shows a diagram of a second portion of the sensor electronics.

FIGS. 2 and 3 show details of the electronic circuitry included in the demodulator. Shown in FIG. 2 is a dual monostable multivibrator circuit 30. The circuit may comprise the SN74HC123 Retriggerable Monostable Multivibrator device from Texas Instruments. The two monostable multivibrators generate the control pulses for sending the light pulse to the light modulators and for detecting the return pulses. Resistor 36, capacitor 38, resistor 40 and capacitor 42 are selected by methods known to those of ordinary skill in the art for selecting the pulse widths of the output pulses from the two monostable multivibrators. Resistor 32 and capacitor 34 are utilized by delay the initiation of the first output pulse following power turn on and may preferably have a time constant of about one second. When capacitor 34 charges up, the 1Q and 1Q terminals are enabled to generate a first output pulse.

The 1Q terminal output from the dual monostable multivibrators is applied to the input of pulser 46. Pulser 46 may comprise the TTLPGM-40 device made by Manby Engineered Components Company. In a preferred embodiment, this pulser is selected to have an output pulse width of about 90 nanoseconds. The output from pulser 46 controls the gates of MOSFETs (metal-oxide silicon field effect transistors) 48 and 50. During the 90 nanosecond output pulse, the two MOSFETs conduct current which flows through laser diode 2. The light from this laser diode then travels down optical path 4 to the light modulators.

The 2Q output from dual monostable multivibrator circuit 30 is applied to pulser 54. Pulser 54 may also comprise the TTLPGM-40 device made by Manby Engineered Components Company. The output from pulser 54 is applied to the input of delay mudule 56. The output from delay module 56 is applied to the input of delay module 58. Delay modules 56 and 58 may comprise the TTLDL250 device made by Technitrol, Inc. The output signals from pulser 54, delay module 56 and delay module 58 are applied, via electrical conductors 59, 66 and 61, respectively, to the T/HLD terminals of track and hold circuits 62, 80 and 92, respectively, shown in FIG. 3. In a preferred embodiment, the pulse width of the output pulse from pulser 54 is selected to be 40 nanoseconds. The output pulses from delay module 56 and delay module 58 may be substantially identical to the output from pulser 54 except that they are delayed in time by selected amounts. Pulser 54, delay module 56, and delay module 58 are configured so that the 40-nanosecond output pulses are at a low, or ZERO, state. The amount of delay is selected as a function of the physical dimensions of the system. The timing of the output pulses from pulser 54 and delay modules 56 and 58 are selected so that the 40 nanosecond low, or ZERO, level pulses are applied to the T/HLD terminals of track and hold circuits 68, 80 and 92, respectively, during the time period when the reflected optical energy pulses from reflectors 20, 24 and 28 are at the ANA IN terminals of the track and hold circuits.

FIG. 3 shows the detection portion of the system demodulator circuit. The light pulses return from reflectors 20, 24 and 28 via optical paths 16 and 8 and are detected by photodetector 10. The electrical output signal from the photodetector 10 is AC coupled through capacitor 112 to the analog input terminals (ANA IN) of track and hold circuits 62, 80 and 92. Track and hold circuits 62, 80 and 92 may comprise the HTC-0500 device made by Analog Devices.

During the time the input to the T/HLD terminal of a track and hold circuit is at a low, or ZERO, state, the track and hold circuit will track the input signal level applied to its ANA IN terminal. When the input to the T/HLD terminal goes to a high or ONE state, the signal level then at the ANA IN terminal will be "held" at the OUT terminal until the next transition to a ZERO level at the T/HLD input terminal.

When power is initially turned on to the system and capacitor 34, which is connected to the ICLR terminal of the dual monostable multivibrator circuit 30, charges to a positive voltage, the monostable multivibrators are enabled to begin operation. Initially, a high, or ONE level, output pulse is generated at the 1Q output and simultaneously a ZERO-level pulse on the 1Q terminal. When the output from terminal 1Q goes low, an output pulse is generated on the 2Q and 2Q terminals, positive going on the 2Q terminal and negative going on the 2Q terminal. When the output from 2Q goes low, the output from the 1Q terminal goes up, and so on. Selection of the duration of the pulses will depend on the frequency at which it is desired to sample the modulating parameters to which modulators 22 and 27 are subjected, and on the transmission time of the optical pulse from the light source 2 to reflectors 20, 24 and 28 and back to photodetector 110.

Pulser 46 initiates a pulse, enabling MOSFETS 48 and 40 to conduct current, upon detection of the trailing edge of the negative output pulse from the 1Q terminal of monostable circuits 30. The periods of the output pulses from the two monostables are selected so that there is sufficient time for the optical pulse to travel to the most distant of the reflectors (reflector 28 in the embodiment described herein) and to return before the next optical pulse is emitted.

The output from track and hold circuit 62 passes through low-pass filter 65, unity gain amplifier 68 and amplifier 69. In a preferred embodiment, resistor 64 and capacitor 66 are selected so that filter 64 has a cut-off frequency at about 500 Hz. In a preferred embodiment, resistors 70, 71 and 73 are selected by methods known to those of ordinary skill in the art so that amplifier 69 has a gain of about six. Similarly, the output signals from track and hold circuits 80 and 92 are passed through low pass filter 83, amplifier 86 and amplifier 87; and low pass filter 95, amplifier 98 and amplifier 99, respectively. Low-pass filters 83 and 95 may also be selected to have a cutoff frequency at about 500 Hz and amplifiers 87 and 99 may also have a gain of about six.

The electrical output signal from amplifier 69, representative of the optical energy reflected from partial reflector 20 is applied to the X1 terminals of dividers 74 and 104. The electrical output signal from amplifier 87, representative of the optical energy reflected from reflector 24 is applied to the Z2 terminal of divider 74, and the electrical output signal from amplifier 99, representative of the optical energy reflected from reflector 28 is applied to the Z2 terminal of divider 104.

Dividers 74 and 104, which may be AD535 devices made by Analog Devices, are configured in a preferred embodiment so that with equal amplitude input signals to the X1 and Z2 terminals, the output will be +10 volts, and for an input signal on terminal X1 of twice the amplitude of the input signal on terminal Z2 the output amplitude will be +5 volts, and so on.

Amplifiers 79 and 105 are unity gain differential inverting amplifiers. If the output signals from divider 74 or 104 is +10 volts, then the output from amplifier 79 or 105, respectively, will be 0 volts, and vice versa.

Track and hold circuits 62, 80 and 92 include offset adjustment terminals (OFF ADJ), by which any DC system offset can be compensated for. By varying the position of the variable terminal of resistors 120, 122, and 124, the system is adjusted so that if no signal is present at light modulators 22 and 29, the system output signals from amplifiers 79 and 105 will be zero. Resistors 91 and 101 in amplifier circuits 87 and 99 may preferably be variable resistors to enable the system to be calibrated. For a known signal level applied to modulators 22 and 29, the resistance of resistors 91 and 101 is varied to achieve the desired corresponding output from amplifiers 97 and 105. The system gain may be calibrated by resistors 91 and 101 which vary the gain of amplifiers 87 and 99. Calibration may be performed by inducing a known magnitude of the parameter to be measured by light modulators 22 and 29, and adjusting the value of resistors 91 and 101 until the desired output signal is obtained from amplifiers 79 and 105.

In the invention, a first partial reflecting interface is positioned at a location near to but preceding a light modulator. A determination of the parameter which is modulating the light modulator is made by comparing the magnitude of the optical energy reflected from this first partial reflector to the magnitude of the optical energy reflected from a reflector positioned on the other side of the light modulator. In the preferred embodiment described herein, the output of divider 74 represents the ratio of the optical energy which is transmitted through modulator 29 to the optical energy which is reflected from partial reflector 20. Similarly, the output of divider 104 represents the ratio of the optical energy transmitted through modulator 22 to the optical energy which is reflected from partial reflector 20. Because all reflected light pulses will experience substantially the same variations, other than the variations induced on the light modulator, an accurate measurement of the variations in the parameter of interest is obtained.

Various modifications and alterations in the practice of this invention will be apparent to those skilled in the art without departing from the scope and spirit of this invention. Although the invention was described in connection with a specific preferred embodiment, it should be understood that the invention as claimed should not be unduly limited to such specific embodiments.

I claim:

1. An apparatus for sensing a parameter modulating an optical fiber sensor comprising:
   an optical energy modulator;
   an optical energy source;
   an optical path for conveying the optical energy from said optical energy source to said optical energy modulator;
   a first optical reflector positioned in said optical path between said source and said optical energy modulator for reflecting a portion of the optical energy reaching said first optical reflector;
   a second optical reflector on the opposite side of said optical energy modulator from said first reflector for reflecting optical energy reaching said second reflector;
   detection means responsive to the magnitude of the reflected energy from the first reflector and the second reflector for comparing the magnitude of the reflected energy from said first reflector and said second reflector for determining the modulating parameter; and
   a second optical path for conveying said optical energy reflected from said partial reflector and from said second reflector to said detection means.

2. The apparatus of claim 1 wherein said optical energy modulator is adapted to sense the pressure wave of a marine seismic source.

3. A system for detecting modulating parameters with optical fiber sensors, comprising:
   a source of pulsed optical energy;
   a first optical energy modulator;
   a second optical energy modulator;
   a first optical path;
   a first partial optical reflector positioned in said first optical path for reflecting a portion of the optical energy reaching said first optical reflector and for transmitting a portion of said optical energy;
   a second and a third optical path;
   an optical coupler for coupling a part of said transmitted portion of optical energy to said second path and a part of said transmitted portion of optical energy to said third path, said second path conducting optical energy through said first modulator and said third path conducting optical energy through said second modulator;
   a second and a third optical reflector, said second optical reflector reflecting optical energy back through said second optical path to said partial reflector and said third optical reflector reflecting optical energy back through said third optical path to said partial reflector;

a photodetector;

a fourth optical path for conducting the reflected optical energy from said partial reflector and said second and third reflectors to said photodetector, said photodetector generating electrical output signals proportional to the magnitude of the optical energy reflected from said partial reflector and said second and third reflectors; and demodulator means for responding to the magnitude of the electrical output signals from said photodetector to generate signals representing the parameters modulating said first and second optical energy modulators.

4. A method for detecting a modulating parameter with an optical fiber sensor comprising:

transmitting an optical energy pulse through an optical path;

reflecting a first portion of said optical energy, and transmitting a second portion of said optical energy through an optical energy modulator;

reflecting said second portion of said optical energy, said reflected first portion and said reflected second portion of said optical energy being transmitted through the same optical path;

detecting the magnitude of the reflected first portion and the reflected second portion of said optical energy; and comparing said magnitudes to determine the magnitude of said modulating parameter.

5. A method for detecting a modulating parameter with an optical fiber sensor, comprising:

transmitting a pulse of optical energy from an optical energy source through an optical path;

reflecting a first portion of the optical energy of said pulse with a partial reflector and transmitting a second portion of the optical energy of said pulse through an optical modulator;

reflecting, with a second reflector, the optical energy transmitted through the optical modulator back to the partial reflector;

conducting the optical energy reflected from said partial reflector and from said second reflector through a common optical path to the input of a photodetector, said photodetector generating electrical optical pulses corresponding to the magnitude of the optical energy reflected from said partial reflector and said second reflector; and comparing the magnitude of the output pulses from said photodetector to generate an output signal representative of said modulating parameter.

6. The method of claim 5 further comprising selecting a time width for said pulse of optical energy and an optical path length from said partial reflector to said second reflector so that the optical energy reflected from said partial reflector and said second reflector will be separated in time when said energy reaches said photodetector.

7. A method for detecting a plurality of modulating parameters with an optical fiber sensing system, comprising:

transmitting a pulse of optical energy from an optical energy source through a first optical path;

coupling a portion of the optical energy of said pulse into a plurality of second paths, each of said second paths conducting optical energy through an optical modulator and terminating in an optical reflector which reflects optical energy;

reflecting with a partial reflector a portion of the optical energy of the pulse transmitted through said first path before said pulse reaches an optical modulator;

transmitting through a third optical path said portion of the optical energy pulse reflected before said pulse reaches an optical modulator, and the optical energy reflected by each of the optical reflectors which terminate the second optical paths;

detecting the optical energy transmitted through said third optical path with a photodetector to generate electrical pulses having a magnitude corresponding to the magnitude of the optical energy reflected by said partial reflector and each of said terminating reflectors; and comparing the magnitude of the electrical pulse corresponding to the optical energy reflected from said partial reflector to the magnitude of the electrical pulse corresponding to the optical energy reflected from at least one of said terminating reflectors to determine at least one of said modulating parameters.

8. The method of claim 7 wherein each of said second paths has a different length and the time width of said pulse transmitted from said optical source and the lengths of each of said second paths is selected so that the optical energy reflected from said partial reflector and the optical energy reflected from each of said terminating reflectors will be separated in time when said energy reaches said photodetector.

* * * * *